US008740158B2

(12) United States Patent
Silcox et al.

(10) Patent No.: US 8,740,158 B2
(45) Date of Patent: Jun. 3, 2014

(54) HAT CHANNEL ADAPTOR FOR SPRINKLER SUPPORT ASSEMBLY

(75) Inventors: Paul S. F. Silcox, Wrentham, MA (US); Peter M. MacDonald, Sherbon, MA (US); Norman J. MacDonald, III, Lunenburg, MA (US)

(73) Assignee: Flexhead Industries, Inc., Harvey, IL (US)

( * ) Notice: Subject to any disclaimer, the term of this patent is extended or adjusted under 35 U.S.C. 154(b) by 830 days.

(21) Appl. No.: 12/823,894

(22) Filed: Jun. 25, 2010

(65) Prior Publication Data

US 2011/0315409 A1 Dec. 29, 2011

(51) Int. Cl.

*A62C 31/28* (2006.01)
*A62C 35/68* (2006.01)
*E04B 9/06* (2006.01)
*F16L 3/00* (2006.01)
*F16L 3/12* (2006.01)
*B05B 15/06* (2006.01)

(52) U.S. Cl.

USPC ....... 248/75; 248/230.4; 248/316.5; 248/317; 248/342; 248/343; 169/37; 169/51; 239/283

(58) Field of Classification Search

CPC ........... E04B 9/006; E04B 9/06; E04B 9/064; E04B 9/067; E04B 9/068; E04B 9/12; E04B 9/127; E04B 9/18; E04B 9/30; A62C 31/02; A62C 31/28; A62C 33/04; A62C 35/68; A62C 37/09; B05B 15/061; F16L 3/003; F16L 3/12; F16B 2/10

USPC ................ 169/16, 37, 51; 239/273, 282, 283; 248/65, 72, 73, 75, 230.4, 231.51, 248/316.5, 317, 342–344; 52/506.06, 52/506.07

See application file for complete search history.

(56) References Cited

U.S. PATENT DOCUMENTS 6,119,784 A 9/2000 MacDonald et al.
6,123,154 A 9/2000 MacDonald et al.

(Continued)

FOREIGN PATENT DOCUMENTS

EP 1 695 744 A1 8/2006
EP 1695744 A2 8/2006

(Continued)

OTHER PUBLICATIONS

International Search Report and Written Opinion received for PCT Patent Application No. PCT/US2011/041775, mailed Jan. 10, 2013, 8 pages.

(Continued)

*Primary Examiner* — Darren W Gorman
(74) *Attorney, Agent, or Firm* — Kacvinsky Daisak Bluni PLLC

(57) ABSTRACT

An adaptor is provided that is configured to receive a support assembly for mounting a flexible fire sprinkler fitting in a ceiling support structure formed of parallel, spaced beams. The adaptor includes first and second long sides configured to be secured to each beam of an adjacent pair of beams, and first and second short sides configured to be secured to the support assembly. One end of each long side is joined by the first short side, and an opposed end of each long side is joined by the second short side such that the first and second long sides are parallel to each other and perpendicular to the first and second short sides, whereby the adaptor is a generally elongated, hollow, rectangular structure. The adaptor permits the support assembly to be mounted in a suspended ceiling formed of hat channel or metal stud furring.

27 Claims, 9 Drawing Sheets

(56) References Cited

U.S. PATENT DOCUMENTS

| | | | |
|---|---|---|---|
| 6,488,097 | B1 | 12/2002 | MacDonald, III et al. |
| 6,752,218 | B2 | 6/2004 | MacDonald et al. |
| 7,032,680 | B2 | 4/2006 | MacDonald et al. |
| 7,255,315 | B2 | 8/2007 | Oh |
| 7,735,787 | B2 | 6/2010 | Kafenshtok |
| 2002/0066834 | A1 | 6/2002 | Choi |

FOREIGN PATENT DOCUMENTS

| | | | |
|---|---|---|---|
| JP | 6-337082 | | 12/1994 |
| JP | 9-196241 | | 7/1997 |
| WO | 2009/082082 | A1 | 7/2009 |
| WO | 2009082082 | A1 | 7/2009 |

OTHER PUBLICATIONS

Standard Specification for Nonstructural Steel Framing Members, ASTM International, Aug. 29, 2008—Designation: C645-08a.

Standard Specification for the Manufacture, Performance, and Testing of Metal Suspension Systems for Acoustical Tile and lay-in Panel Ceilings, ASTM International, Oct. 2004—Designation C 635-04.

Standard Practice for Installation of Metal Ceiling Suspension Systems for Acoustical Tile and Lay-in Panels, ASTM International, Jun. 10, 2004—Designation C 636-04.

Standard Practice for Application for Ceiling Suspension Systems for Acoustical Tile and Lay-in Panels in Areas Requiring Seismic Restraint, ASTM International, May 31, 2006—Designation; E 580-02.

Standard Specification for Installation of Steel Framing Members to Receive Screw-Attached Gypsum Panel Products, ASTM International, Aug. 28, 2008—Designation: C754-07.

HAT CHANNEL ADAPTOR FOR SPRINKLER SUPPORT ASSEMBLY

The invention relates to an adaptor used in a fire protection sprinkler head support system.

BACKGROUND OF THE INVENTION

A typical automatic fire sprinkler system includes a network of pipes that carry a fire suppression fluid, e.g., water, to each room in a building. Conduit sections carry the fluid from the pipes to sprinkler heads strategically located in different rooms. The position and orientation of each sprinkler head is typically maintained in place by a support assembly. When the room reaches an elevated temperature due to a fire, the sprinkler head is activated allowing a stream of fire suppression fluid to be directed over the intended area of coverage. During operation, the fluid pressure at the sprinkler head can reach as high as 175 psi, generating significant back pressure on the sprinkler head's support system. The support assembly is used to hold the sprinkler head securely in place during operation.

Some known sprinkler support assemblies are designed to secure a sprinkler head at a predetermined position within suspended ceiling system formed an array of T-bar furring members. However, suspended ceiling systems are not limited to T-bar type systems, and may include alternative suspension systems in which the support grid is formed of alternative furring members.

SUMMARY

In some aspects, an adaptor is provided that is configured to receive a support assembly for mounting a flexible fire sprinkler fitting in a ceiling support structure, the ceiling support structure including parallel, spaced beams. The adaptor includes first and second long sides configured to be secured to each beam of an adjacent pair of beams, and first and second short sides configured to be secured to the support assembly. One end of each long side is joined by the first short side, and an opposed end of each long side is joined by the second short side such that the first and second long sides are parallel to each other and perpendicular to the first and second short sides. Each short side has an L cross-sectional shape defined by a short side base portion, and a short side upright portion extending in a direction generally normal to the short side base portion, and the one end and opposed end of each long side are supported on the short side base portion.

The adaptor may include one or more of the following features: Each short side includes a flange protruding from the short side upright on a side opposed to the short side base such that each short side has a T cross-sectional shape. The one end and the opposed end of each long side is supported on the short side base portion so as to abut the short side upright portion. Each long side has an L cross-sectional shape defined by a long side base portion, and a long side upright portion extending in a direction generally normal to the long side base portion, a free edge of the long side base portion being aligned with an end of the short side. The spacing between the respective long side upright portions corresponds to the width of the support assembly. A free edge of the short side upright portion includes a protrusion that protrudes in a direction away from the short side base portion. The protrusion is formed by rolling the free edge of the short side upright portion back over the short side upright portion so the short side upright portion has a cross section in the form of the letter P. The beams include hat channel members. Each hat channel member includes a channel base, sidewalls extending from opposed side edges of the channel base, and a flange extending along an edge of each sidewall in a direction generally parallel to the channel base, wherein the long side is configured to secure to the flange. Each long side has an L cross-sectional shape defined by a long side base portion, and a long side upright portion extending in a direction generally normal to the long side base portion, wherein the long side base portion is configured to secure to the flange. The beams include metal studs. The beams include wood studs. The adaptor is further configured to provide sufficient height for mounting the flexible fire sprinkler fitting at a vertical location relative to the ceiling support structure to permit one of semi-recessed or fully recessed position of a sprinkler head connected to the fitting.

In some aspects, a fire sprinkler support assembly is provided for supporting a flexible fire sprinkler fitting within a ceiling structure comprising parallel, spaced beams. The support assembly includes an adaptor, a leg, and a hub assembly. The adaptor includes first and second long sides configured to be secured to each beam of an adjacent pair of beams, and first and second short sides configured to be secured to the support assembly. One end of each long side is joined by the first short side, and an opposed end of each long side is joined by the second short side such that the first and second long sides are parallel to each other and perpendicular to the first and second short sides. Each short side has an L cross-sectional shape defined by a short side base portion, and a short side upright portion extending in a direction generally normal to the short side base portion. The one end and opposed end of each long side are supported on the short side base portion. The leg extends transverse to the short sides, and opposed ends of the leg are connected to and supported on the short sides via connection members. In addition, the hub assembly is supported on the leg and includes a hub opening configured to receive the flexible fire sprinkler fitting.

The fire sprinkler support assembly may include one or more of the following features: The leg includes a bar, and each connection member is configured to straddle a short side upright portion. Each connection member is clamped to a short side upright portion. Each connection member is configured to engage a protrusion formed on a short side upright portion. The leg includes a central slot. The leg includes lateral slots disposed between the central slot and lateral sides of the leg. Each long side has an L cross-sectional shape defined by a long side base portion, and a long side upright portion extending in a direction generally normal to the long side base portion, and the spacing between the respective long side upright portions corresponds to the width of the connection member. The hub assembly includes a primary support mounted to the leg, and a secondary support member rotatable relative to a primary support member between an open position and a closed position, and in the closed position, cut outs formed in the primary support cooperate together with cut outs formed in the secondary support to define the hub opening. The hub assembly further includes a locking mechanism configured to selectively connect the primary support to the secondary support, and an adjustment mechanism disposed on the primary support that is configured to secure the position of the portion of the flexible fire sprinkler fitting within the hub opening, and is separate from the locking mechanism. The beams include hat channel. The beams include hat channel, and each hat channel includes a channel base, sidewalls extending from opposed side edges of the channel base, and a flange extending along an edge of each sidewall in a direction generally parallel to the channel base, and the long side is configured to secure to the flange. The beams include metal studs. The beams include wood studs.

The assembly is configured to provide sufficient height for mounting the flexible fire sprinkler fitting at a vertical location relative to the ceiling support structure to permit one of semi-recessed or fully recessed position of a sprinkler head connected to the fitting.

In some aspects, a fire protection sprinkler system is provided which includes the support assembly described above and a flexible sprinkler assemblage. The flexible sprinkler assemblage includes the flexible fire sprinkler fitting including a first end configured to connect to a flexible fluid supply line, and a second end configured to connect to a fire sprinkler head. The assemblage also includes a flexible fluid supply line connected to the first end. A portion of the flexible fire sprinkler fitting is disposed in the hub opening.

In some aspects, a method of mounting a support assembly within a non-T-bar ceiling support structure is provided. The support assembly is configured to secure a flexible fire sprinkler fitting to a T-bar ceiling support structure. The non-T-bar ceiling support structure includes parallel, spaced beams. The method includes positioning an adaptor such that the adaptor rests on each beam of a pair of adjacent beams, the adaptor configured to correspond to the configuration of a portion of a T-bar ceiling support structure; securing the adaptor to each beam of the pair of adjacent beams; and securing the support assembly to the adaptor.

The method may include one or more of the following additional steps or features: The adaptor includes first and second long sides configured to be secured to each beam of the adjacent pair of beams, and first and second short sides configured to be secured to the support assembly. One end of each long side is joined by the first short side, and an opposed end of each long side is joined by the second short side such that the first and second long sides are parallel to each other and perpendicular to the first and second short sides. Each short side has an L cross-sectional shape defined by a short side base portion, and a short side upright portion extending in a direction generally normal to the short side base portion. The one end and opposed end of each long side are supported on the short side base portion, and the step of securing the adaptor to the beam includes fixing each long side to a beam. The support assembly includes a leg extending transverse to the short sides, opposed ends of the leg including connection members, and a hub assembly supported on the leg and including a hub opening configured to receive the flexible fire sprinkler fitting, and the step of securing the support assembly to the adaptor includes connecting the connection members to the short sides. A free edge of the short side upright portion includes a protrusion that protrudes in a direction away from the short side base portion, and the respective connection members are configured to engage the protrusion when connecting to the short sides. Each long side has an L cross-sectional shape defined by a long side base portion, and a long side upright portion extending in a direction generally normal to the long side base portion, and the spacing between the respective long side upright portions corresponds to the width of the support assembly. The beams include hat channel. In addition, each hat channel includes a channel base, sidewalls extending from opposed side edges of the channel base, and a flange extending along an edge of each sidewall in a direction generally parallel to the channel base, and the long side is configured to secure to the flange. The beams include metal studs. The beams include wood studs. The step of securing the support assembly to the adaptor includes providing sufficient vertical spacing between the support assembly and a ceiling panel secured to the ceiling support structure to permit a fire sprinkler head mounted to the fitting to be in a fully recessed or semi recessed position relative to the ceiling panel.

The adaptor receives and supports a sprinkler support assembly that is designed for installation within a T-bar grid suspended ceiling, and quickly and easily secures the sprinkler support assembly within a suspended ceiling system that is not of the T-bar grid type. Thus, the adaptor adapts the sprinkler support assembly for use in non-T-bar-type suspended ceilings such as those formed with hat channel furring, or formed of parallel studs.

The adaptor enables positioning of the sprinkler support assembly at a predetermined position within suspended ceiling system. The adaptor permits the sprinkler support assembly, and thus the sprinkler head, to be positioned at a desired location within the plane of the ceiling. In addition, the adaptor positions the sprinkler support assembly at an appropriate height above the ceiling to permit semi-recessed or fully recessed positioning of the sprinkler head relative to the ceiling. In practice, as many as 90 percent of fire sprinkler heads are mounted within ceilings in a semi-recessed or fully-recessed configuration. However, many types of ceiling structural support beams, including hat channel furring, are not of sufficient height to provide adequate vertical spacing for the support and sprinkler head assemblies relative to the ceiling to permit such recessed sprinkler head mounting. The adaptor allows installation of the support assembly on the support beam and also leaves sufficient vertical spacing between the ceiling and support assembly to permit positioning of the sprinkler head in the desired recessed configuration.

Modes for carrying out the present invention are explained below by reference to an embodiment of the present invention shown in the attached drawings. The above-mentioned object, other objects, characteristics and advantages of the present invention will become apparent from the detailed description of the embodiment of the invention presented below in conjunction with the attached drawings.

DETAILED DESCRIPTION

Figure 1:
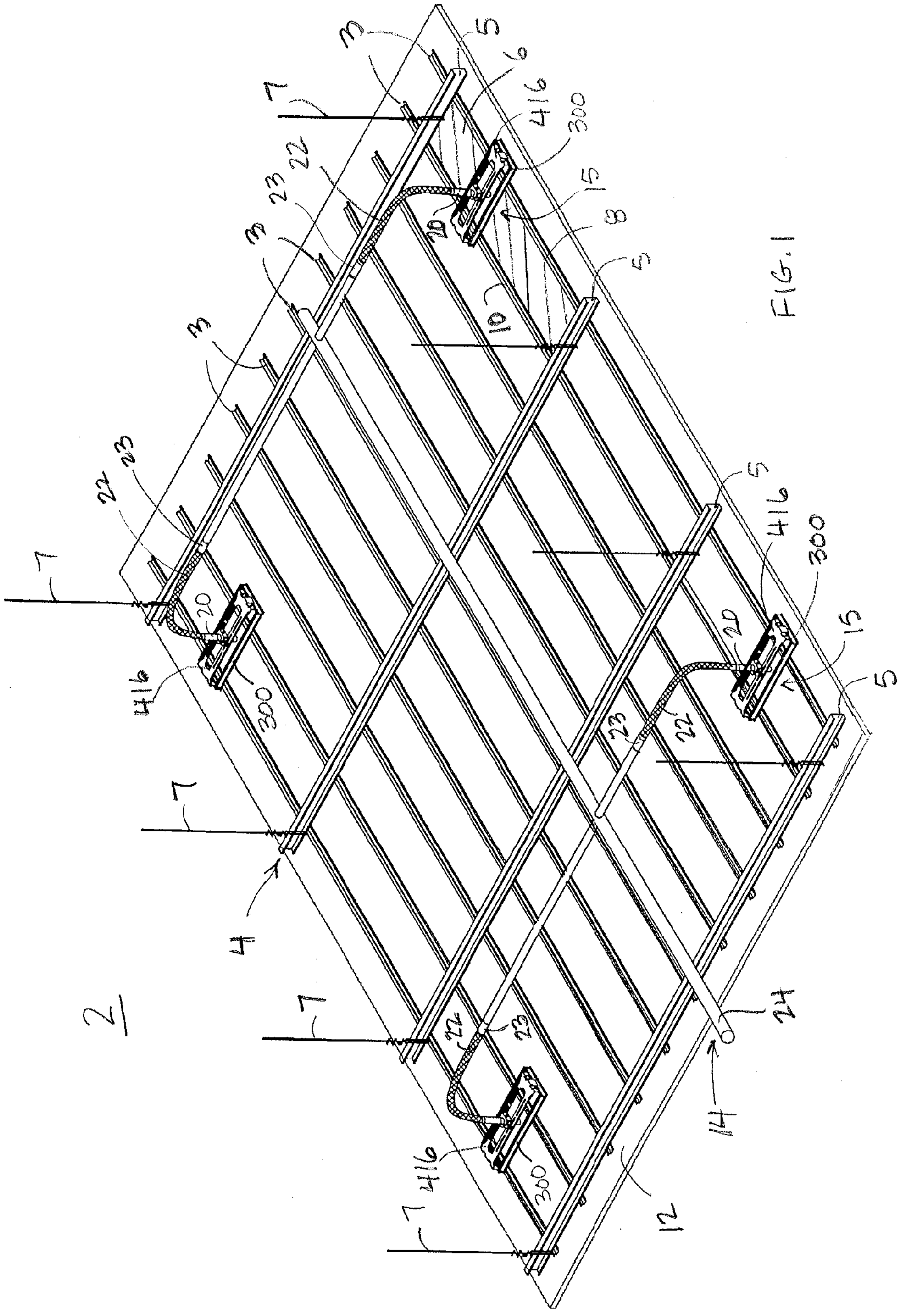
FIG. 1 is a diagrammatic, perspective view of adaptors used to mount sprinkler support assemblies within a suspended ceiling formed of hat channel furring.

With reference to FIG. 1, a sprinkler system 14 includes several sprinkler support assemblies 416 mounted within a ceiling 2 having a ceiling frame 4 formed of an array of rectangular frame sections 6 (one frame section 6 is shown with cross hatch). The ceiling frame 4 can be a suspended ceiling for supporting a ceiling panel 12. For example, the ceiling frame 4 may consist of a series of parallel, spaced hat furring channel 3 supported on cross furring members 5. The cross furring members 5 are suspended from an overlying building structure using flexible wire 7, and may be configured according to ASTM International standards. The standards may include, but are not limited to, those set forth in one or more of designations C645-08*a* and C754-07, which are each incorporated herein by reference. In order to protect the room from fire, the sprinkler system 14 is most commonly located above the ceiling frame 4, but can also reside in a floor or in one or more walls.

Figure 9:
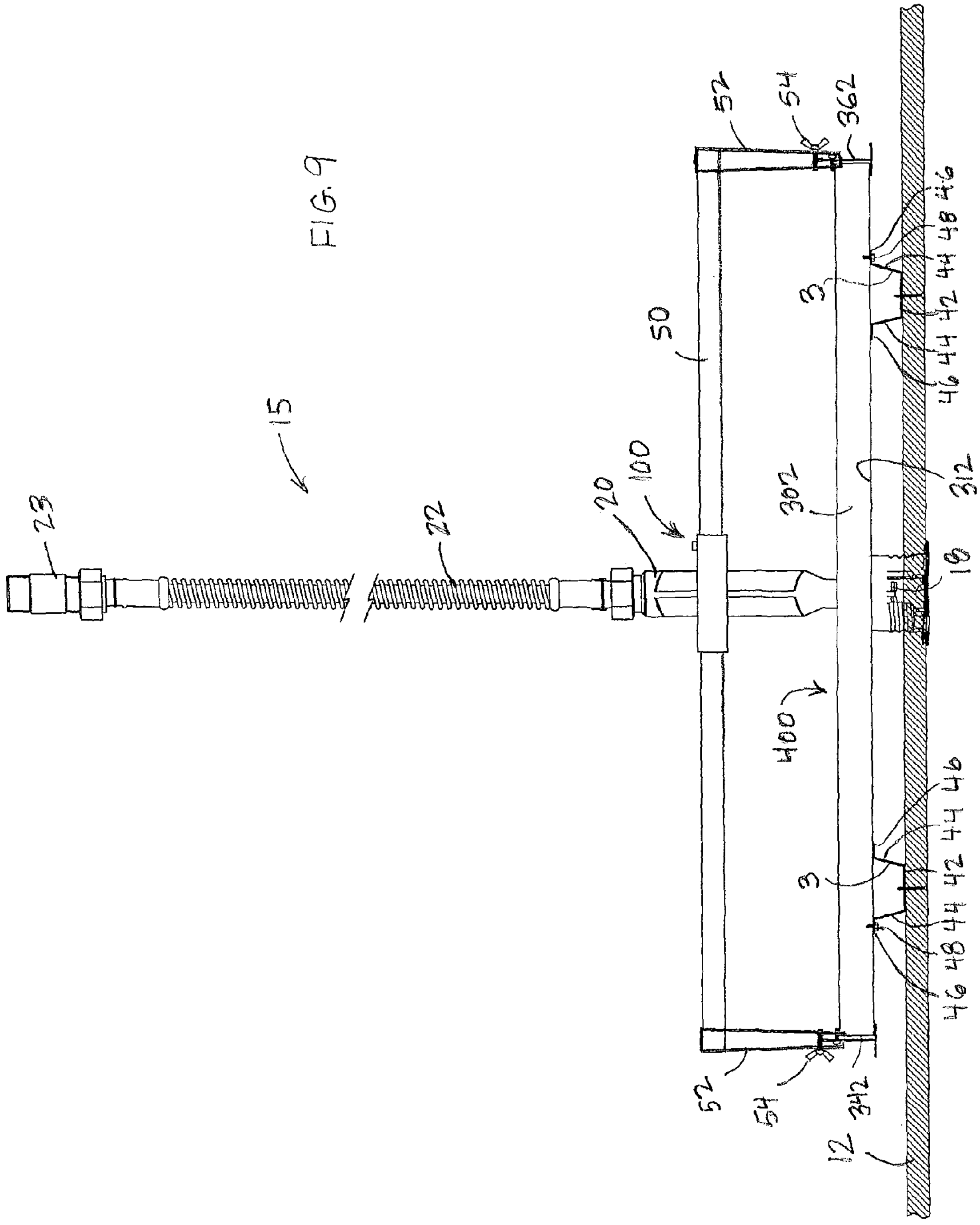
FIG. 9 is a side view of the adaptor and sprinkler support assembly of FIG. 7 within a suspended ceiling formed of hat channel furring.
Figure 10:
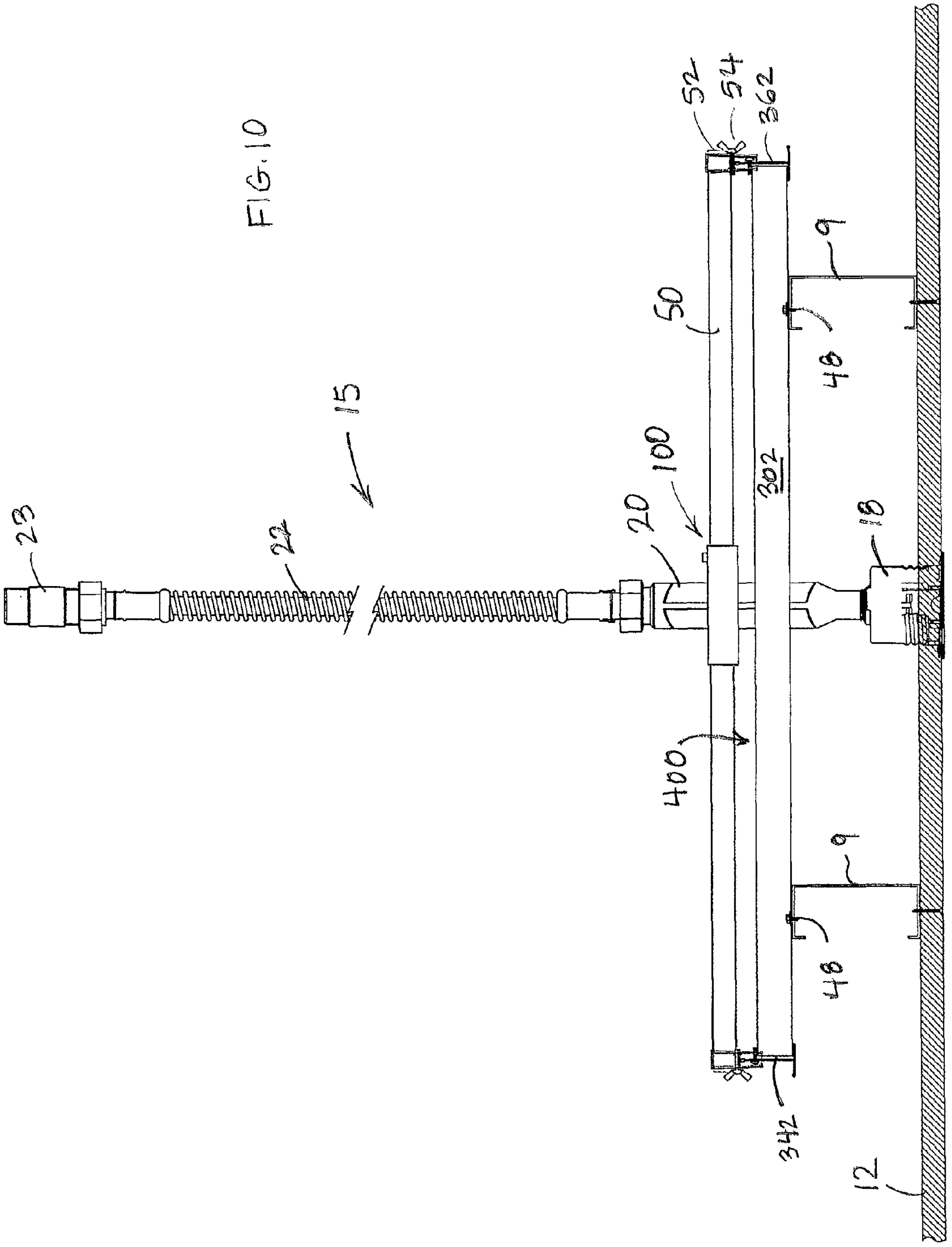
FIG. 10 is a side view of the adaptor and sprinkler support assembly of FIG. 7 within a suspended ceiling formed of metal studs.

The fire sprinkler system 14 can include supply pipes 24 as part of a fire suppression fluid delivery system. The fluid delivery system can be dedicated to fire suppression, or can also deliver water to other functions (e.g., within the building). The fire sprinkler system 14 also includes a flexible sprinkler assemblage 15 that carries the fire suppression fluid, e.g. water, from the supply pipes 24 to the sprinkler head 18. For example, the flexible sprinkler assemblage 15 can include an inlet fitting 23 which connects the assemblage 15 to the supply pipe 24, and a flexible conduit 22 which extends between the inlet fitting 23 and one end of a rigid sprinkler head fitting 20. The flexible conduit 22 may be formed of braided metal, and be welded to both the inlet fitting 23 and sprinkler head fitting 20 (FIG. 2), or may be formed of corrugated metal and joined to both the inlet fitting and sprinkler head fitting 20 using screw connectors (FIGS. 9 and 10). The assemblage 15 can further include the sprinkler head 18 which is connected to another end of the sprinkler head fitting 20. When the room reaches elevated temperatures, sprinkler head 18 is activated and a stream of fire suppression fluid is directed into the room to extinguish the fire.

In order to function effectively, sprinkler head 18 must be held firmly in place during operation. Sprinkler support assemblies 416 are designed to secure a sprinkler head 18 at a predetermined position within a frame section 6 of a grid of T-bar furring members, for example as described in U.S. Pat. No. 6,488,097 which is incorporated here by reference. Due to the significant back pressure of the fluid flowing therethrough, sprinkler head 18 is subjected to tremendous side, rotational, and torsional forces, which are capable of changing the position of the sprinkler head 18, thereby causing the fluid to be directed away from the intended target. The sprinkler support assembly 416 is configured to resist movement of sprinkler head 18 by distributing the forces to spaced-apart points along the periphery of one of the rectangular frame sections 6.

Figure 2:
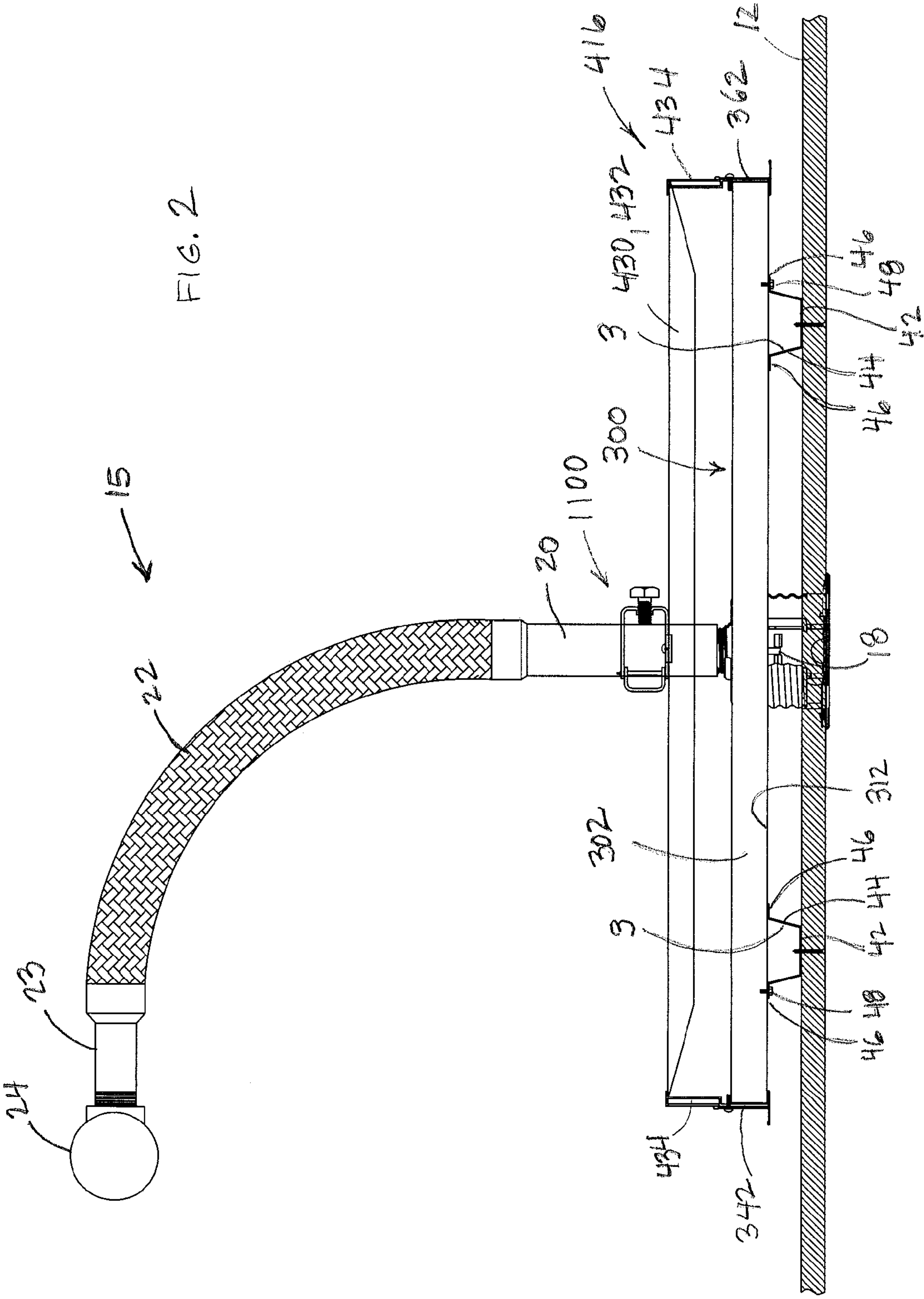
FIG. 2 is a side view of one of the adaptors of FIG. 1 supporting a sprinkler support assembly within a suspended ceiling formed of hat channel furring.

Referring FIG. 2, an adaptor 300 is used to adapt the sprinkler support assembly 416 for use within ceiling frame 4, which is a non-T-bar grid ceiling suspension system. The adaptor 300 receives and supports the sprinkler support assembly 416 and can be rigidly secured to the ceiling frame 4 in such a manner that the sprinkler head 18 can be positioned at any location within the rectangular frame section 6, as discussed further below.

In the illustrated embodiment, the opposed sides 8, 10 of the rectangular frame section 6 correspond to an adjacent pair of hat furring channel 3. When viewed in cross-section, each hat channel 3 includes a channel base 42 which extends generally parallel to the ceiling 2 and which provides a flat surface to which the ceiling panel 12 is secured. Hat channel sidewalls 44 extend out of the plane defined by the channel base 42 from opposed side edges of the channel base 42, and a flange 46 extends along an edge of each hat channel sidewall 44 in a direction generally parallel to the channel base 42. Thus, the flanges 46 also extend generally parallel to the ceiling 2, and provide a surface to which the adaptor 300 is secured.

Referring to FIGS. 3-6, the adaptor 300 includes first and second long sides 302, 322 that extend across the rectangular frame section 6 from one frame side 8 to the opposite and parallel frame side 10 and are secured to each respective frame side 8, 10. The adaptor 300 also includes first and second short sides 342, 362 that are sized and shaped to receive and be secured to a support assembly 416. In particular, the first and second short sides 342, 362 each have a cross-sectional size and shape that generally corresponds to that of a T-bar furring member, as discussed further below. A first end 304, 324 of each long side 302, 322 is joined by the first short side 342, and an opposed, second end 306, 326 of each long side 302, 322 is joined by the second short side 362 such that the first and second long sides 302, 322 are parallel to each other and perpendicular to the first and second short sides 342, 362, providing a generally elongated, hollow, rectangular structure. The long sides 302, 322 and the short sides 342, 362 are conventionally joined by, for example, riveting or welding.

The first and second short sides 342, 362 each have a cross-sectional shape in the form of a T, for example generally having the following appearance: ⊥. This shape permits the sprinkler support assembly 416, which is designed to be secured to T-bar furring members, to be easily and quickly secured to the adaptor 300. One of ordinary skill will appreciate that the T section can be considered to include an L cross section: ⌊, or its mirror image: ⌋, defined by a short side base portion 350, 370, and a short side upright portion 348, 368 extending in a direction generally normal to the short side base portion 350, 370. In addition, each short side 342, 362 includes a base flange 354, 374 protruding from the short side upright portion 348, 368 on a side opposed to the short side base 350, 370 such that each short side 342, 362 has the T cross-sectional shape.

In addition, each short side upright portion 348, 368 includes a protrusion 359, 379 formed along a free edge 349, 369 of the short side upright portion 348, 368. The protrusion 359, 379, which is intended to mimic a bulb provided at a corresponding location on a standard T-bar furring member, is formed by rolling the free edge 349, 369 back over the corresponding short side upright portion 348, 368 so the short side upright portion 348, 368 has a cross section generally in the form of the letter P. For each short side upright portion 348, 368, the protrusion 359, 739 protrudes in a direction away from the short side base portion 350, 370 and thus overlies the corresponding short side base flange 354, 374.

The first and second long sides 302, 322 each have an L cross-sectional shape defined by a long side base portion 312, 332, and a long side upright portion 308, 328 extending in a direction generally normal to the long side base portion 312, 332. The first ends 304, 324 of each respective long side 302, 322 are supported on the base portion 350 of the first short side 342 so as to abut the first short side upright portion 348. Likewise, the second ends 306, 326 of each respective long side 302, 322 are supported on the base portion 370 of the second short side 362 so as to abut the second short side upright portion 368. In addition, the free edge 314 of the first long side base portion 312 is aligned with the respective first ends 344, 364 of the short sides 342, 362, and the free edge 334 of the second long side base portion 332 is aligned with the respective second end 346, 366 of the short sides 342, 362. As a result, the respective uprights 308, 328 of the long sides 302, 322 are disposed inward relative to the ends 344,346, 364, 366 of the short sides 342, 362.

In addition to providing a mounting structure to which the support structure 416 can be easily and securely attached, the adaptor 300 also serves to provide additional support for the mounting structure 416. In particular, the spacing w1 between the respective long side upright portions is set to correspond to the width of the support assembly being adapted. In this case, the spacing w1 between the respective long side upright portions is set to correspond to the width w2 of the support assembly 416. As a result, the long side upright portions 308, 328 provide an abutting surface which support lateral edges of the clip portion 434 of the support assembly 416, providing further lateral stabilization of the support assembly 416 within the ceiling frame 4.

The length of the adaptor 300 is slightly greater than the distance between an adjacent pair of hat furring channel 3, so that the when the adaptor is disposed within the ceiling frame 4, the long sides 302, 322 extend across the adjacent pair of hat furring channel 3. in the illustrated embodiment, the long sides 302, 322 of the adaptor 300 are disposed generally transverse to the hat furring channel 3. In addition, the base portion 312, 332 of each long side 302, 322 rests on, and is secured to the flange 46 of a hat furring channel 3 using a fastener 48 such as a screw.

Figure 3:
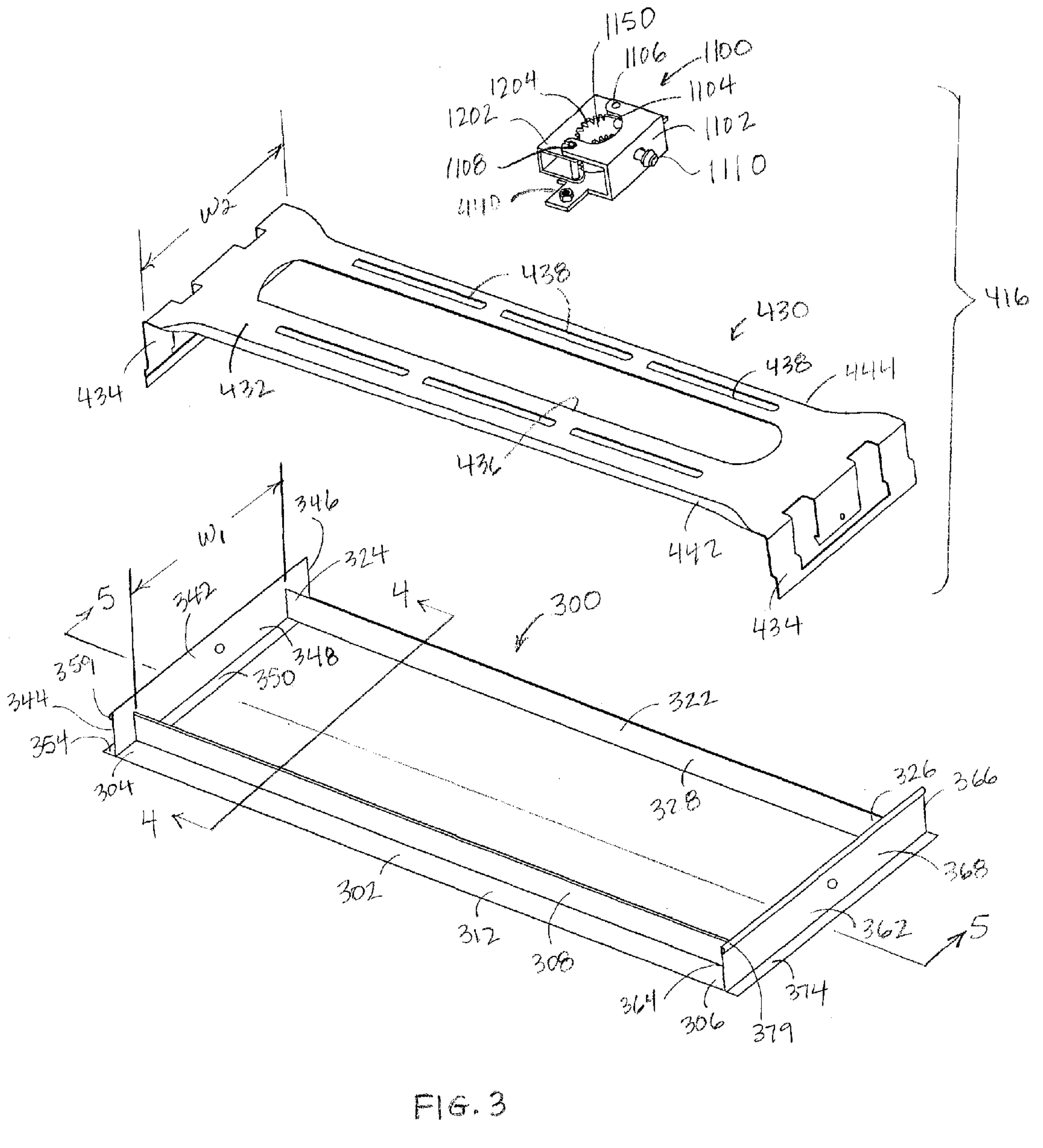
FIG. 3 is an exploded perspective view of the adaptor and sprinkler support assembly of FIG. 2.
Figure 4:
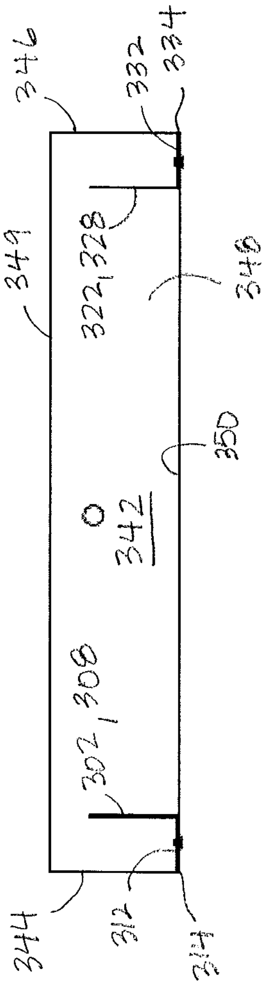
FIG. 4 is a view of the adaptor of FIG. 2 as seen along line 4-4 of FIG. 3.
Figure 5:
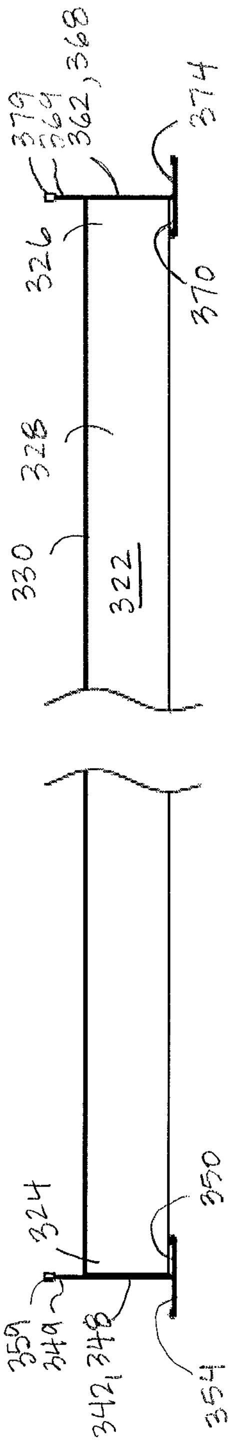
FIG. 5 is a view of the adaptor of FIG. 2 as seen along line 5-5 of FIG. 3.
Figure 6:
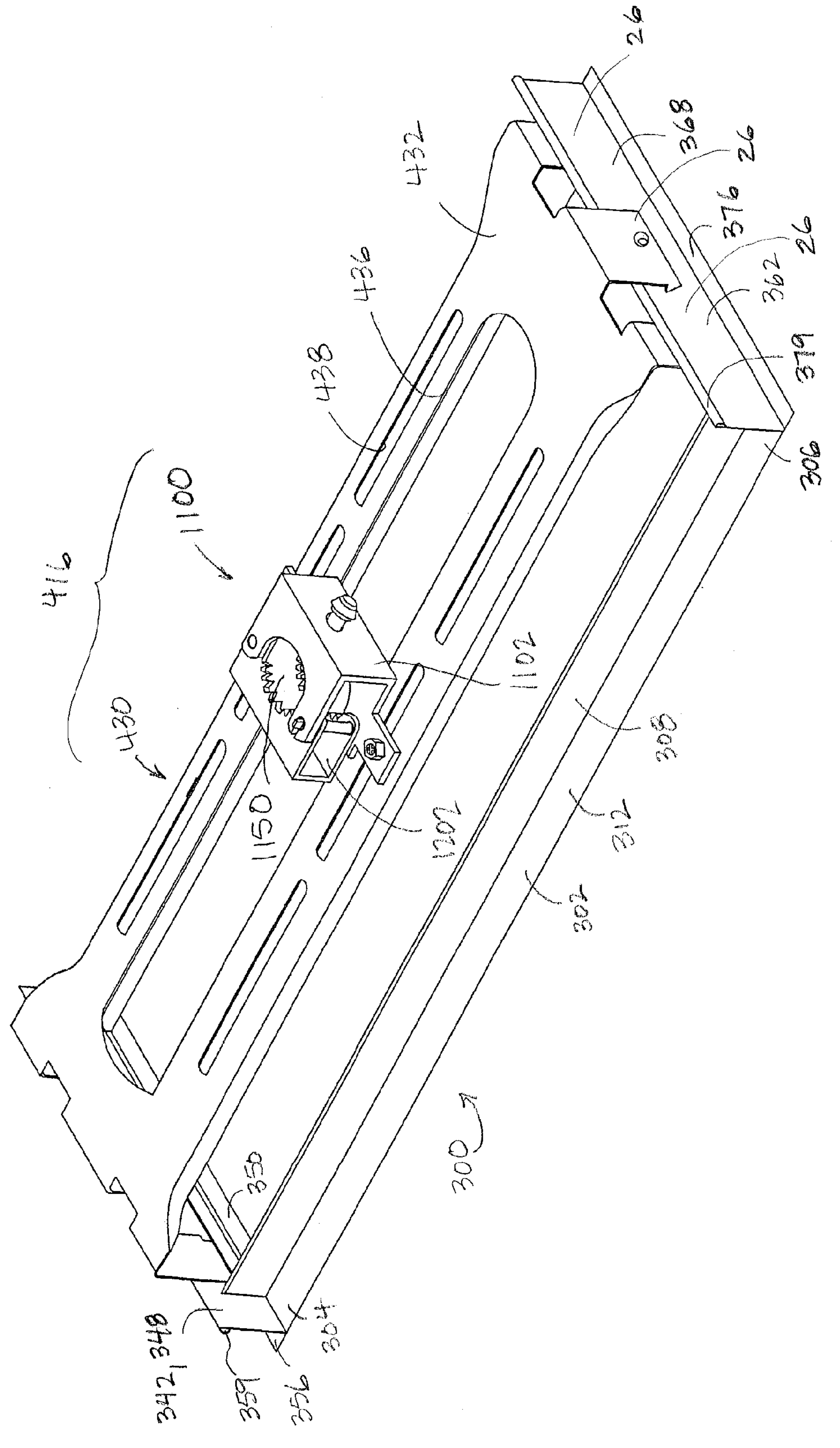
FIG. 6 is an assembled perspective view of the adaptor and sprinkler support assembly of FIG. 2.

Referring particularly to FIGS. 3 and 6, the adaptor 300 receives and supports the sprinkler support assembly 416 and rigidly secures the sprinkler support assembly 416 to the ceiling frame 4 in such a manner that the sprinkler head 18 can be positioned at any location within the rectangular frame section 6. The sprinkler support assembly 416 includes a hub assembly 1100 which receives a portion of the fire sprinkler assemblage 15, and a bracket 430 which connects the hub assembly 1100 to the adaptor 300.

The bracket 430 is configured to resist the forces imparted to sprinkler head 18 during its operation, and includes a leg 432 and clip portions 434 which connect the leg 432 to the respective short sides 342, 362 of the adaptor 300. The leg 432 is a relatively wide member that extends from the first adaptor short side 342 to the opposed adaptor short side 362, and thus lies generally parallel to the ceiling 2 as well as the respective adaptor long sides 302, 322. The clip portions 434, which connect the leg 432 to the respective short sides 342, 362, may be fixed to the short side 342, 362 using screws. The leg 432, including the clip portions 434, is provided with a width w1 that ensures that the forces on the support assembly 416 during sprinkler head operation are distributed to several points 26 along a portion each of the adaptor short sides 342, 362. As a result, stability of the support assembly 416 is ensured and the sprinkler head 18 is prevented from moving or rotating in any direction during operation.

The leg 432 includes a central slot 436 that is sized to receive the sprinkler head fitting 20, and is elongated in a direction transverse to the width of the leg 432 to permit adjustment of the position of the sprinkler head fitting 20 within the frame section 6. For example, the central slot 436 extends substantially from one short side 342 to the other 362. The leg 432 also includes lateral slots 438 sized to receive a hub assembly mounting screw 440. The lateral slots 438 are disposed between the central slot 436 and lateral sides 442, 444 of the leg 432, and are elongated in a direction transverse to the width of the leg 432 to permit adjustment of the location of the screws within the leg 432. Although the lateral slots 432 spaced apart along the transverse direction, the position of the adaptor 300 relative to the ceiling frame 4 can be adjusted to accommodate for this spacing between adjacent slots 432, whereby the adjustment of the position of the sprinkler head fitting 20 within the frame section 6 is unlimited.

The hub assembly 1100 includes a primary support 1102 which mounts on the leg 432 of the support assembly 416, and a secondary support 1202 that is rotatably connected to the primary support 1102, as described in co-pending U.S. application Ser. No. 12/784,286, which is incorporated here by reference. The secondary support 1202 rotates relative to the primary support 1102 about a pin 1106 between an open position (not shown) and a closed position (shown). The primary support 1102 and secondary support 1202 are each formed having cut out portions 1104, 1204, so that when the secondary support 1202 is in the closed position relative to the primary support 1102, the cut out 1104 formed in the primary support 1102 cooperates with the cut out 1204 formed in the secondary support 1202 to define a hub opening 1150 configured to receive and securely retain the sprinkler head fitting 20. When the hub assembly 1100 is secured to the leg 432, the hub opening 1150 coincides with the central slot 436. In addition, the hub assembly 1100 includes a locking mechanism 1108 that selectively connects the primary support 1102 to the secondary support 1202, and an adjustment mechanism 1110 provided on the primary support 1102 is used to secure the position of the sprinkler head fitting 20 within the hub opening 1150.

Figure 7:
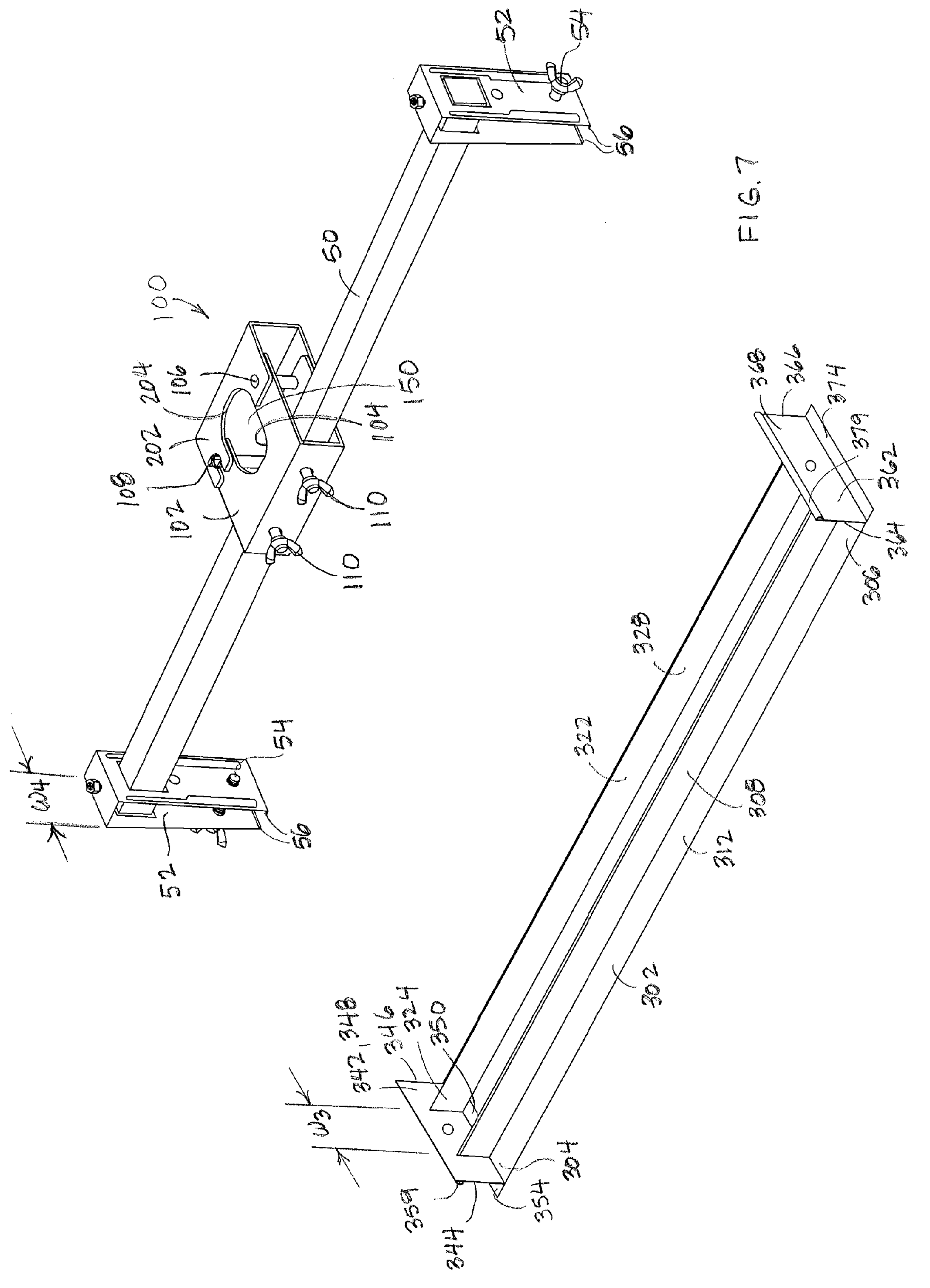
FIG. 7 is an exploded perspective view of an alternative adaptor and alternative sprinkler support assembly.
Figure 8:
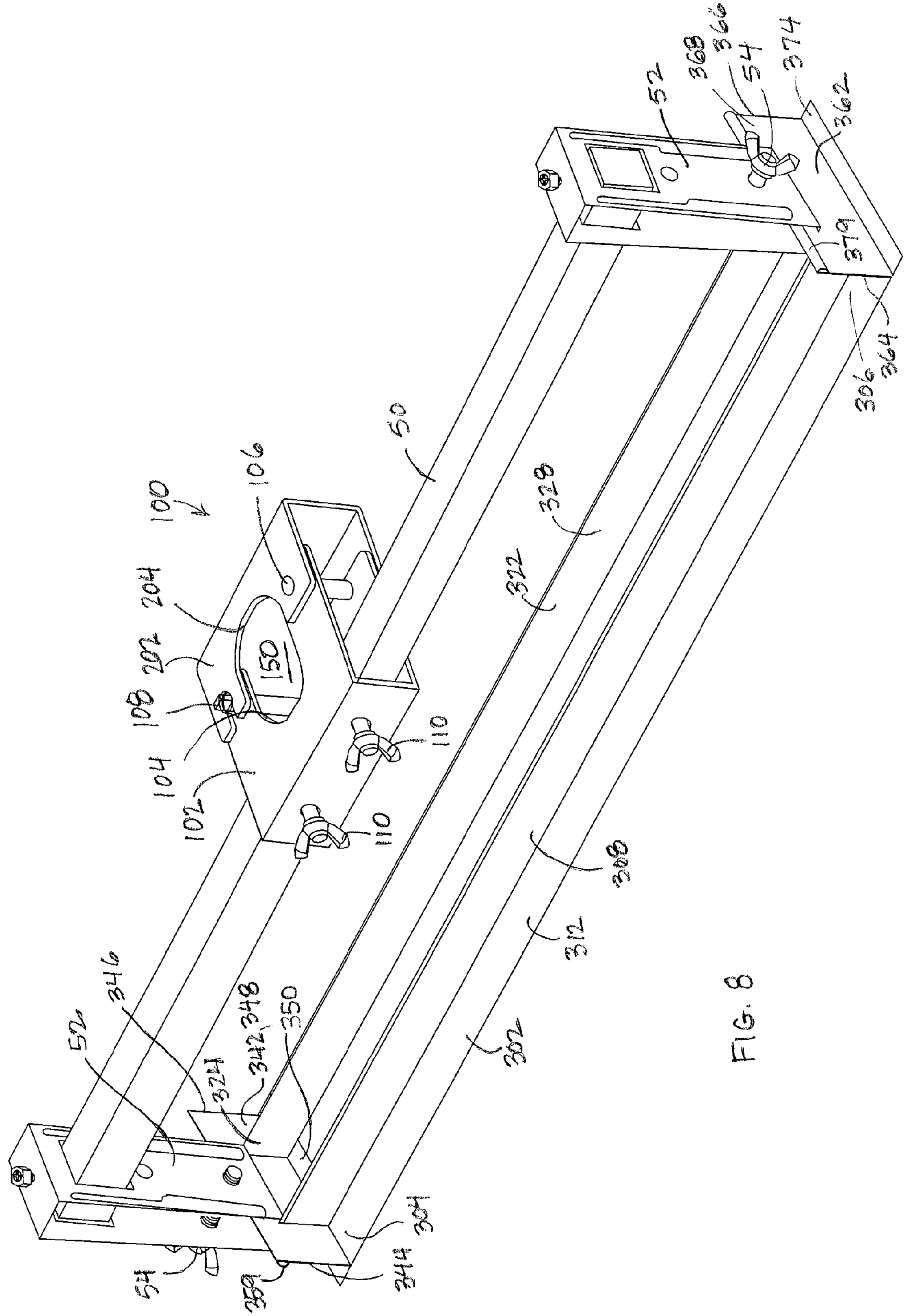
FIG. 8 is an assembled perspective view of the adaptor and sprinkler support assembly of FIG. 7.

Referring to FIGS. 7 and 8, an alternative sprinkler support assembly 16 includes a hub assembly 100 and a leg 50 that connects an alternative hub assembly 100 at a predetermined position within a frame section 6 of a grid of T-bar furring members. In addition, an alternative embodiment adaptor 400 is used to adapt the sprinkler support assembly 16 for use within the suspended ceiling frame 4 formed of hat furring channel 3.

The adaptor 400 is substantially similar to adaptor 300 described above, and therefore structures common to both adaptors 300, 400 will be referred to using the same reference numbers, and descriptions of common structures will be omitted. The adaptor 400 differs from the earlier embodiment only with respect to its width, as discussed further below. Like the earlier embodiment adaptor 300, the adaptor 400 receives and supports the sprinkler support assembly 16 and can be rigidly secured to the ceiling frame 4 in such a manner that the sprinkler head 18 can be positioned at any location within the rectangular frame section 6, as discussed further below.

The hub assembly 100 is supported within the frame section 6 by the leg 50 which is in the form of a slender bar that extends across the adaptor 400 from the first short side 342 to the opposite and parallel second short side 362. The leg 50 of the sprinkler support assembly 16 is configured to resist the forces imparted to sprinkler head 18 during its operation. Opposed ends of the leg 50 include clips 52 through which the leg 50 is supported above the adaptor short sides 342, 362. Each clip 52 is bifurcated, straddles the corresponding adaptor short side 342, 362, and is fixed thereto, for example using a bolt 54 which passes through the clip 52 to clamp the clip 52 to the short side upright portion 348, 368 with its T-bar-like profile. The clamping surface 56 of each clip 52 includes an inward protruding lip which can engage the respective protrusions 359, 379 of the adaptor short sides 342, 362 to ensure that the sprinkler support assembly is securely joined to the adaptor 400.

As discussed above with respect to the adaptor 300, the adaptor 400 also serves to provide additional support for the mounting structure 16. In particular, the spacing w3 between the respective long side upright portions 308, 328 is set to correspond to the width of the support assembly being adapted. In this case, the spacing w3 between the respective long side upright portions 308, 328 is set to correspond to the width w4 of the support clips 52 of the support assembly 16. As a result, the long side upright portions 308, 328 provide an abutting surface which support lateral edges of the clips 52, providing further lateral stabilization of the support assembly 16 within the ceiling frame 4.

Referring to FIG. 9, the length of the adaptor 400 is slightly greater than the distance between an adjacent pair of hat furring channel 3, so that the when the adaptor 400 is disposed within the ceiling frame 4, the long sides 302, 322 extend across the adjacent pair of hat furring channel 3. In the illustrated embodiment, the long sides 302, 322 of the adaptor 300 are disposed generally transverse to the hat furring channel 3. In addition, the base portion 312, 332 of each long side 302, 322 rests on, and is secured to the flange 46 of a hat furring channel 3 using a fastener 48 such as a screw.

The alternative embodiment hub assembly 100 is used with the sprinkler support assembly 16 and includes a primary support 102 which mounts on the leg 50, and a secondary support 202 that is rotatably connected to the primary support 102, as described in co-pending U.S. application Ser. No. 12/784,286. The secondary support 202 rotates relative to the primary support 102 about a pin 106 between an open position (not shown) and a closed position (shown). The primary support 102 and secondary support 202 are each formed having cut out portions 104, 204, so that when the secondary support 202 is in the closed position relative to the primary support 102, the cut out 104 formed in the primary support 102 cooperates with the cut out 204 formed in the secondary support 202 to define a hub opening 150 configured to receive and securely retain the sprinkler head fitting 20. The hub assembly 100 includes a locking mechanism 108 that selectively connects the primary support 102 to the secondary support 202. In addition, the hub assembly 100 includes an adjustment mechanism 110 provided on the primary support 102 is used to secure the position of the hub assembly 100 relative to the leg 50 and the position of the sprinkler head fitting 20 within the hub opening 150.

Referring to FIG. 10, although the illustrated embodiments disclose use of the adaptors 300, 400 to adapt the sprinkler support assemblies 16, 416 for use with a ceiling frame 4 formed of parallel, spaced hat furring channel 3, the adaptors 300, 400 are not limited to use with hat furring channel 3. For example, the adaptor 300, 400 can adapt the sprinkler support assemblies 16, 416 for use in other non-T-bar-type ceilings having parallel, spaced ceiling beams including wood or metal studs 9. For example, in a sheetrock ceiling 12 that is supported by metal studs 9, the adaptor 400 is secured to each stud 9 of a pair of adjacent metal studs 9. In particular, the base portion 312, 332 of the long sides 302, 322 of the adaptor 400 are secured to the metal studs using screws 48. The adaptor 400 receives and supports the sprinkler support assembly 16 including the hub assembly 100. The hub assembly 100 supports the sprinkler head fitting 20 so as to maintain the sprinkler head 18 in the desired position relative to the sheet rock ceiling panel 12. In this embodiment, because the metal studs 9 are relatively tall compared to the hat channel furring 3, the clips 54 are formed with a reduced vertical dimension in order to permit correct placement of the sprinkler head 18 within the ceiling 2.

A selected illustrative embodiment of the invention is described above in some detail. It should be understood that only structures considered necessary for clarifying the present invention have been described herein. Other conventional structures, and those of ancillary and auxiliary components of the system, are assumed to be known and understood by those skilled in the art. Moreover, while a working example of the present invention has been described above, the present invention is not limited to the working example described above, but various design alterations may be carried out without departing from the present invention as set forth in the claims.

We claim:

1. An adaptor configured to receive a support assembly for mounting a flexible fire sprinkler fitting in a ceiling support structure, the ceiling support structure including parallel, spaced beams, the adaptor comprising;

first and second long sides configured to be secured to each beam of an adjacent pair of beams, and first and second short sides configured to be secured to the support assembly, one end of each long side being joined by the first short side, and an opposed end of each long side being joined by the second short side such that the first and second long sides are parallel to each other and perpendicular to the first and second short sides, each short side having an L cross-sectional shape defined by a short side base portion, and a short side upright portion extending in a direction generally normal to the short side base portion, the one end and opposed end of each long side being supported on the short side base portion;

wherein the first and second long sides each have a long side base portion and a long side upright portion extending generally normal to the long side base portion; and wherein respective free edges of the first and second long side base portions are oriented outwardly with respect to a center of the adapter such that the respective upright portions of the first and second long sides are disposed inward relative to ends of the short sides.

2. The adaptor of claim 1 wherein each short side includes a flange protruding from the short side upright portion on a side opposed to the short side base portion such that each short side has a T cross-sectional shape.

3. The adaptor of claim 1 wherein the one end and the opposed end of each long side is supported on the short side base portion so as to abut the short side upright portion.

4. The adaptor of claim 1 wherein each long side has an L cross-sectional shape defined by the long side base portion, and the long side upright portion extending in a direction generally normal to the long side base portion, the free edges of each long side base portion being aligned with one of the ends of an associated one of the first and second short sides.

5. The adaptor of claim 4 wherein the spacing between the respective long side upright portions corresponds to the width of the support assembly.

6. The adaptor of claim 1, wherein a free edge of each short side upright portion includes a protrusion that protrudes in a direction away from the short side base portion.

7. The adaptor of claim 6 wherein each protrusion is formed by rolling the free edge of the short side upright portion back over the short side upright portion so the short side upright portion has a cross section in the form of the letter P.

8. The adaptor of claim 1 wherein the beams include hat channel members.

9. The adaptor of claim 8 wherein each hat channel member includes a channel base, sidewalls extending from opposed side edges of the channel base, and a flange extending along an edge of each sidewall in a direction generally parallel to the channel base, wherein each long side is configured to secure to the flange.

10. The adaptor of claim 9 wherein each long side has an L cross-sectional shape defined by the long side base portion, and the long side upright portion extending in a direction generally normal to the long side base portion, wherein the long side base portion is configured to secure to the flange.

11. The adaptor of claim 1 wherein the beams include metal studs.

12. The adaptor of claim 1 wherein the beams include wood studs.

13. The adaptor of claim 1 further configured to provide sufficient height for mounting the flexible fire sprinkler fitting at a vertical location relative to the ceiling support structure to permit one of semi-recessed or fully recessed position of a sprinkler head connected to the fitting.

14. A fire sprinkler support assembly for supporting a flexible fire sprinkler fitting within a ceiling support structure comprising parallel, spaced beams, the support assembly comprising:

an adaptor, a bracket including a leg and first and second connection members, and a hub assembly including first and second mounting elements, wherein the adaptor includes first and second long sides configured to be secured to each beam of an adjacent pair of beams, and first and second short sides configured to be secured to the support assembly, one end of each long side being joined by the first short side, and an opposed end of each long side being joined by the second short side such that the first and second long sides are parallel to each other and perpendicular to the first and second short sides, each short side having an L cross-sectional shape defined by a short side base portion, and a short side upright portion extending in a direction generally normal to the short side base portion, the one end and opposed end of each long side being supported on the short side base portion, the leg extending transverse to the short sides, the first and second connection members disposed at opposite ends of the leg such that opposed ends of the leg are connected to and supported on the short sides via the connection members, and wherein the hub assembly is supported on the leg and includes a hub opening configured to receive the flexible fire sprinkler fitting;

wherein the bracket includes a central slot and first and second lateral slots in the leg, the first and second lateral slots disposed between the central slot and first and second lateral sides of the leg, the central slot and the first and second laterals slots elongated in a direction transverse to a width of the leg, the central slot extending substantially from the first connection member to the second connection member, the central slot having a length that is less than a length of the leg, the first and second lateral slots sized to receive the first and second mounting elements of the hub assembly.

15. The fire sprinkler support assembly of claim 14 wherein each connection member is coupled to an associated one of said short side upright portions.

16. The fire sprinkler support assembly of claim 14 wherein each connection member is configured to engage a protrusion formed on an associated one of said short side upright portions.

17. The fire sprinkler support assembly of claim 14 wherein each long side has an L cross-sectional shape defined by the long side base portion, and the long side upright portion extending in a direction generally normal to the long side base portion, and the spacing between the respective long side upright portions corresponds to the width of an associated one of the connection members.

18. The fire sprinkler support assembly of claim 14 wherein the hub assembly includes a primary support member mounted to the leg, and a secondary support member rotatable relative to the primary support member between an open position and a closed position, and in the closed position, cut outs formed in the primary support member cooperate together with cut outs formed in the secondary support member to define the hub opening.

19. The fire sprinkler support assembly of claim 18 wherein the hub assembly further includes a locking mechanism configured to selectively connect the primary support member to the secondary support member, and an adjustment mechanism disposed on the primary support member that is configured to secure the position of the portion of the flexible fire sprinkler fitting within the hub opening, and is separate from the locking mechanism.

20. The fire sprinkler support assembly of claim 14 wherein the beams include hat channel members.

21. The fire sprinkler support assembly of claim 14 wherein the beams include hat channel members, and each hat channel member includes a channel base, sidewalls extending from opposed side edges of the channel base, and a flange extending along an edge of each sidewall in a direction generally parallel to the channel base, wherein each long side is configured to secure to the flange.

22. The fire sprinkler support assembly of claim 14 wherein the beams include metal studs.

23. The fire sprinkler support assembly of claim 14 wherein the beams include wood studs.

24. The fire sprinkler support assembly of claim 14 wherein the assembly is configured to provide sufficient height for mounting the flexible fire sprinkler fitting at a vertical location relative to the ceiling support structure to permit one of semi-recessed or fully recessed position of a sprinkler head connected to the fitting.

25. A fire protection sprinkler system comprising the support assembly of claim 14 and a flexible sprinkler assemblage, the flexible sprinkler assemblage including the flexible fire sprinkler fitting including a first end configured to connect to a flexible fluid supply line, and a second end configured to connect to a fire sprinkler head, and a flexible fluid supply line connected to the first end, wherein a portion of the flexible fire sprinkler fitting is disposed in the hub opening.

26. A fire sprinkler support assembly for supporting a flexible fire sprinkler fitting within a ceiling structure comprising parallel, spaced beams, the support assembly comprising an adaptor, a leg, and a hub assembly, the adaptor including first and second long sides configured to be secured to each beam of an adjacent pair of beams, and first and second short sides configured to be secured to the support assembly, one end of each long side being joined by the first short side, and an opposed end of each long side being joined by the second short side such that the first and second long sides are parallel to each other and perpendicular to the first and second short sides, each short side having an L cross-sectional shape defined by a short side base portion, and a short side upright portion extending in a direction generally normal to the short side base portion, the one end and opposed end of each long side being supported on the short side base portion, the leg extending transverse to the short sides, opposed ends of the leg being connected to and supported on the short sides via connection members, and the hub assembly being supported on the leg and including a hub opening configured to receive the flexible fire sprinkler fitting;

wherein each long side has an L cross-sectional shape defined by a long side base portion, and a long side upright portion extending in a direction generally normal to the long side base portion, and the spacing between the respective long side upright portions corresponds to the width of an associated one of the connection members.

27. A fire sprinkler support assembly for supporting a flexible fire sprinkler fitting within a ceiling structure comprising parallel, spaced beams, the support assembly comprising an adaptor, a leg, and a hub assembly, the adaptor including first and second long sides configured to be secured to each beam of an adjacent pair of beams, and first and second short sides configured to be secured to the support assembly, one end of each long side being joined by the first short side, and an opposed end of each long side being joined by the second short side such that the first and second long sides are parallel to each other and perpendicular to the first and second short sides, each short side having an L cross-sectional shape defined by a short side base portion, and a short side upright portion extending in a direction generally normal to the short side base portion, the one end and opposed end of each long side being supported on the short side base portion, the leg extending transverse to the short sides, opposed ends of the leg being connected to and supported on the short sides via connection members, and the hub assembly being supported on the leg and including a hub opening configured to receive the flexible fire sprinkler fitting;

wherein the hub assembly includes a primary support member mounted to the leg, and a secondary support member rotatable relative to the primary support member between an open position and a closed position, and in the closed position, cut outs formed in the primary support member cooperate together with cut outs formed in the secondary support member to define the hub opening.

* * * * *